United States Patent
Marumoto et al.

[11] Patent Number: 5,105,143
[45] Date of Patent: Apr. 14, 1992

[54] CONTROL SYSTEM FOR AUTOMOTIVE CHARGING GENERATOR

[75] Inventors: Katsuji Marumoto, Hitachi; Keiichi Mashino, Katsuta; Akiteru Ueda, Ibaraki, all of Japan

[73] Assignee: Hitachi, Ltd., Tokyo, Japan

[21] Appl. No.: 347,199

[22] Filed: May 4, 1989

[30] Foreign Application Priority Data

May 6, 1988 [JP] Japan .................. 61-109058

[51] Int. Cl.⁵ .............................................. H02J 1/24
[52] U.S. Cl. .................................... 322/28; 322/25; 323/282
[58] Field of Search ............. 322/25, 27, 28, 72, 322/73, 99; 363/39, 40, 41; 323/282, 284, 285, 272

[56] References Cited

U.S. PATENT DOCUMENTS

| | | | |
|---|---|---|---|
| 3,076,922 | 2/1963 | Seike | 322/28 |
| 4,210,857 | 7/1980 | Korbell | 322/28 |
| 4,245,183 | 1/1981 | Glennon | 322/28 |
| 4,293,904 | 10/1981 | Brooks et al. | 323/282 |
| 4,362,982 | 12/1982 | Akita et al. | 322/28 X |
| 4,388,587 | 6/1983 | Lamoth et al. | 322/28 X |
| 4,442,396 | 4/1984 | Hucker | 322/25 X |
| 4,661,761 | 4/1987 | Katsumata | 322/28 |
| 4,697,135 | 9/1987 | Brandon | 322/28 X |

FOREIGN PATENT DOCUMENTS 51-25715 3/1976 Japan .
55-18839 2/1980 Japan .
57-22338 2/1982 Japan .

Primary Examiner—Steven L. Stephan
Assistant Examiner—Kristine Peckman
Attorney, Agent, or Firm—Antonelli, Terry, Stout & Kraus

[57] ABSTRACT

A charging generator output control system for automobiles is disclosed, in which the field current of the generator is controlled by a chopper, an output voltage of the generator is compared with a predetermined target voltage, the difference therebetween is detected, and the duty factor of an output signal of the chopper is controlled in accordance with the difference while at the same time controlling the frequency of an output signal of the chopper in accordance with the duty factor, thus reducing the difference substantially to zero.

16 Claims, 12 Drawing Sheets

TRAPEZOIDAL FUNCTION GENERATION UNIT

FIG. 19B

TRIGONOMETRIC FUNCTION GENERATION UNIT

5,105,143

CONTROL SYSTEM FOR AUTOMOTIVE CHARGING GENERATOR

BACKGROUND OF THE INVENTION

The present invention relates to a control system for a charging generator, or more in particular to an output voltage control system for a charging generator of an automobile suitably used for charging the battery of the automobile.

Recent years have seen a wide extension of the use of a control system for the automotive charging generator in which the on-off duty factor of the field current is controlled by a chopper. A control system of such a type for a vehicle generator is disclosed in a Japanese patent publication based on an application dated Aug. 28, 1974 filed by Nippon Denso Co., Ltd. and laid open as JP-A-51-25715, a Japanese patent publication based on an application dated July 25, 1978 filed by Nippon Denso Co., Ltd. and laid open as JP-A-55-18839, and a Japanese patent publication based on an application field by Hitachi Ltd. dated July 11, 1980 and laid open as JP-A-57-22338. All of these systems use a fixed frequency method in which the chopping period for control of the field current is kept constant.

The fixed frequency system, in which the pulsation of the field current (ripple) changes depending on the duty factor of the switching operation, has the disadvantage that the performance of the electrical equipment is adversely affected by the pulsation of an output voltage of the generator. Under the worst ripple conditions of the field current, the output voltage of the generator may undergo a vertical fluctuation. In such a case, the headlight or the like flickers undesirably. In order to reduce the ripple, one might consider increasing the switching frequency of the chopper. If the switching frequency is increased into synchronism with the pulsation (ripple) frequency of the output voltage, however, the control operation becomes unstable. A further increase in frequency would cause a radio interference due to high frequency components with noise mixed in radio receiver.

With reference to the specific configuration of a control circuit, the capacity of a capacitor in a time constant circuit of a pulse width modulation (PWM) signal source poses another problem. In other words, an attempt to form a circuit with ICs has encountered a difficulty due to a large capacity of a capacitor.

SUMMARY OF THE INVENTION

An object of the present invention is to keep constant the pulsation (ripple) of the field current of a charging generator without regard to the duty factor thereby to prevent the flickering of the head light or other loads due to the pulsation of an output voltage of the generator.

Another object of the invention is to provide a control system for an automotive charging generator, which can be easily formed in a one-chip IC with a capacitor of small capacity used in a PWM control circuit or the like.

These objects are achieved by controlling the field current of a charging generator by a variable frequency system in which the frequency of a chopper is controlled in accordance with the duty factor by the PWM control means of variable frequency type for the field control chopper, or preferably by controlling the frequency f of the chopper to the secondary function $\alpha(1-\alpha)$ of the duty factor $\alpha$.

In the PWM control circuit for the chopper, the capacity of the capacitor and the resistance value of the PWM signal generation circuit are reduced by feeding back an output voltage to the input by being divided appropriately thereby to generate a PWM waveform. These means facilitate achievement of a control circuit formed of ICs for a control system of an automotive charging generator.

DESCRIPTION OF THE PREFERRED EMBODIMENTS

A charging generator control system for automobiles according to the present invention will be described in detail with reference to the embodiments shown in the accompanying drawings.

Figure 1:
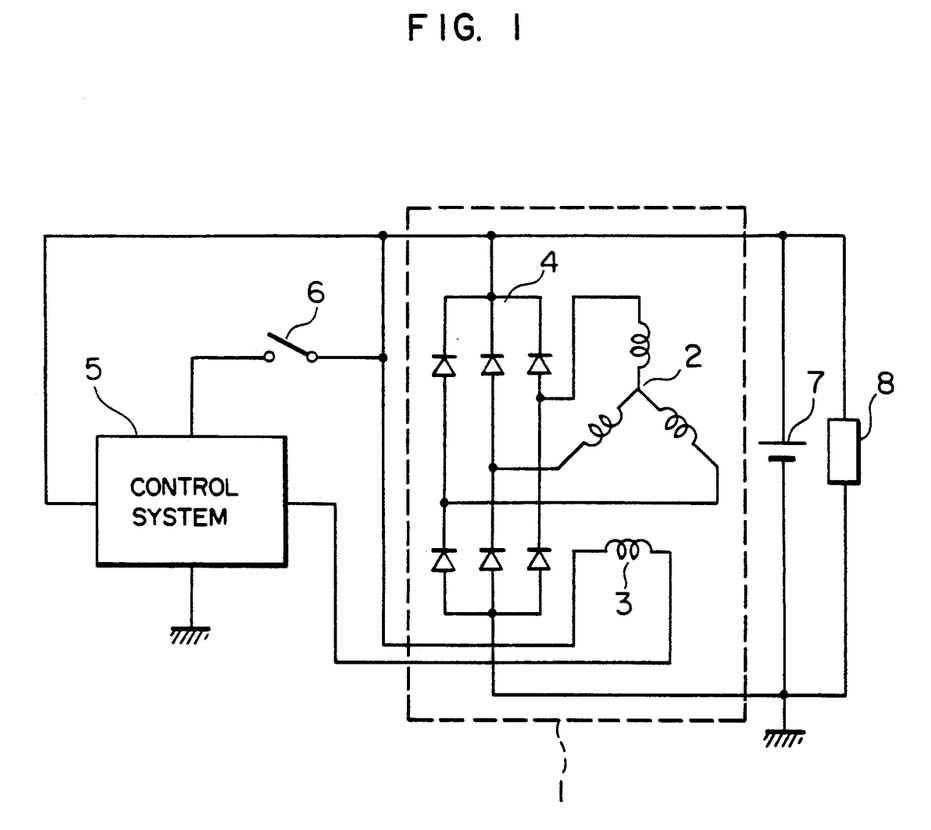
FIG. 1 is a diagram showing a general configuration of an automotive charging a generation system according to the present invention.

First, FIG. 1 is a diagram showing a general configuration of an automotive charging generation system to which an embodiment of an automotive charging generator control system according to the present invention is applicable. In FIG. 1, reference numeral 1 designates a generator, numeral 2 an armature winding, numeral 3 a field winding, numeral 4 a full-wave rectifier, numeral 5 a control system, numeral 6 a key switch, numeral 7 a battery and numeral 8 a load such as headlight.

The generator 1 includes the three-phase armature winding 2, the field winding 3 and the three-phase full-wave rectifier 4 for converting an AC output of the armature winding into a direct current, and is driven by an engine (not shown). An output voltage of the generator 1 is controlled by controlling the current flowing in the field winding 3 by means of the control system 5 and is used to charge the battery 7 or to supply power to the load 8. The control system 5 is actuated by turning on the engine start key switch 6.

Figure 2:
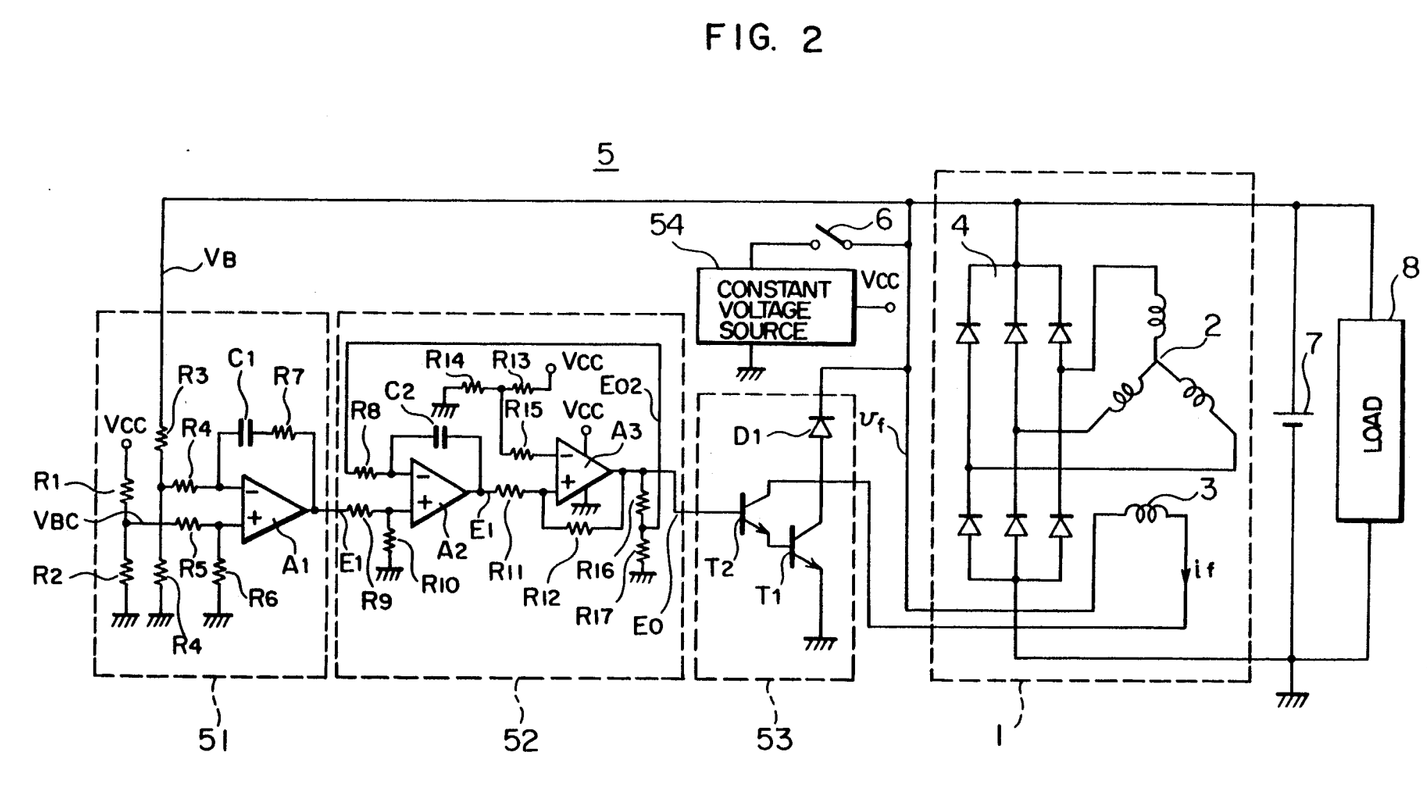
FIG. 2 is a diagram showing a charging generator control system according to a first embodiment of the present invention.

A general configuration of an automotive charging generation control system according to an embodiment of the present invention is shown in FIG. 2. This is an example of configuration of the present invention as applied to the control system 5 in FIG. 1. In all the drawings, the same reference numerals denote equivalent parts.

In FIG. 2, numeral 51 designates a voltage control means, numeral 52 a PWM control unit of frequency variable type, numeral 53 a chopper made up of a switching device such as a power transistor or an FET for controlling the switching of the current flowing in the field winding 3, and numeral 54 a constant-voltage power supply unit for supplying a source voltage $V_{cc}$ to the voltage control means 51 and the PWM control unit 52. These units 51 to 54 make up the control unit 5. The other parts of the configuration are identical to those in FIG. 1.

In the voltage control means 51, reference characters $R_1$ and $R_2$ designate voltage-dividing resistors for dividing the source voltage $V_{cc}$ of the constant-voltage power supply unit 54 and producing a set value $V_{BC}$ of the charge voltage of the battery 7 (output voltage of the generator 1). Reference characters $R_3$ and $R_4$ designate input voltage-dividing resistors for feeding back the battery voltage $V_B$. Character $A_1$ designates an operational amplifier including input resistors $R_4$ to $R_6$, which, together with a resistor $R_7$ and a capacitor $C_1$, constitute a proportional-plus-integral circuit in the feedback section.

In the PWM control unit 52, character $A_2$ designates an operational amplifier, which, together with an input resistor $R_8$ and a feedback capacitor $C_2$, constitutes an integrator. This integrator operates to integrate the input voltage $E_{02}$ on the one hand and makes addition or subtraction between an input voltage $E_1$ divided by input resistors $R_9$ and $R_{10}$ and the other input voltage $E_{02}$. The part designated by $A_3$ in the subsequent stage is also an operational amplifier. The output $E_1$ of the operational amplifier (integrator) $A_2$ is applied to the positive terminal of the operational amplifier $A_3$, and an output $E_0$ thereof is fed back to the positive terminal thereof through a feedback resistor $R_{12}$, thus making up a comparator with hysteresis. The operation level of this comparator is determined by the source voltage $V_{cc}$ divided through the dividing resistors $R_{13}$ and $R_{14}$ and applied to the negative terminal through an input resistor $R_{15}$. In a combined circuit of an integrator and a comparator as configured this way, an output $E_{02}$ obtained by dividing the output $E_0$ of the comparator by the dividing resistors $R_{16}$ and $R_{17}$ is applied to the integrator and fed back, so that the circuit functions as a self-oscillator for producing a rectangular wave. (See below for detailed operation.)

Figure 3:
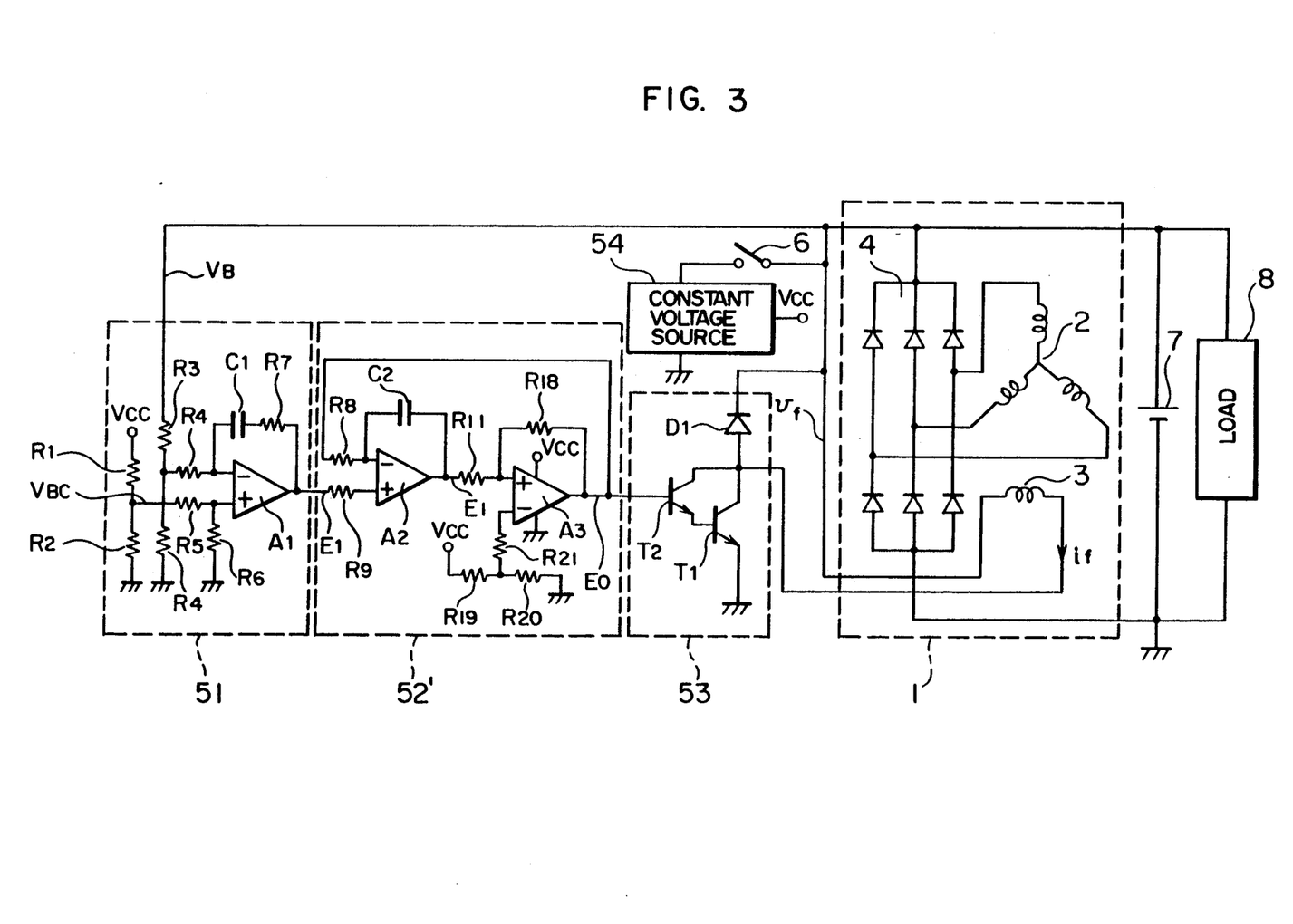
FIG. 3 is a diagram showing a charging generator control system according to a second embodiment of the present invention.

FIG. 3 shows another embodiment of the control unit 5 similar to FIG. 2. The difference of the embodiment shown in FIG. 3 from that in FIG. 2 lies in a PWM control circuit 52' of variable type. This circuit will be described below.

In the PWM control unit 52', character $A_2$ designates an operational amplifier, a resistor $R_8$ and a capacitor $C_2$ make up an integrator for integrating the input voltage. This integrator also makes addition or subtraction between the input voltage $E_1$ applied through an input resistor $R_9$ and a voltage $E_0$ applied through another input resistor $R_8$. The part designated $A_3$ in the subsequent stage is also an operational amplifier constituting a comparator with hysteresis in which an output $E_1$ of the operational amplifier (integrator) $A_2$ is applied through an input resistor $R_{11}$ to the positive terminal thereof and an output $E_0$ thereof is fed back to the positive terminal thereof through a feedback resistor $R_{18}$. The operation level of this comparator is applied to the negative terminal thereof through an input resistor 21 as a source voltage $V_{cc}$ divided by the dividing resistors $R_{19}$ and $R_{20}$. In this combination of an integrator and a comparator as configured above, the output $E_0$ of the comparator is fed back to the input of the integrator thereby to function as a self-oscillator for producing a rectangular waveform (the operation being basically identical to that in FIG. 2). The conspicuous difference of this embodiment from that in FIG. 2 is that the feedback voltage of the output of $A_3$ to $A_2$ is applied directly to the input resistor $R_8$ of the operational amplifier $A_2$ without being divided. The difference in effect between these two embodiments will be described later.

A chopper 53 includes a switching power transistor $T_1$ and a drive transistor $T_2$ and a flywheel diode $D_1$ the switching of the current flowing in the field winding 3. The chopper may alternatively be a switching device such as an FET.

In this configuration (FIGS. 2 and 3), the voltage control circuit 51 effects feedback control so that the actual battery voltage (output voltage of generator) $V_B$ may coincide with a set value of battery charge voltage (target value of output voltage of the generator) $V_{BC}$, and applies a difference voltage $E_1$ between the voltage setting (target voltage value) $V_{BC}$ and the battery voltage $V_B$ to the frequency-variable PWM control unit 52 (or 52' in all cases below).

Figure 4:
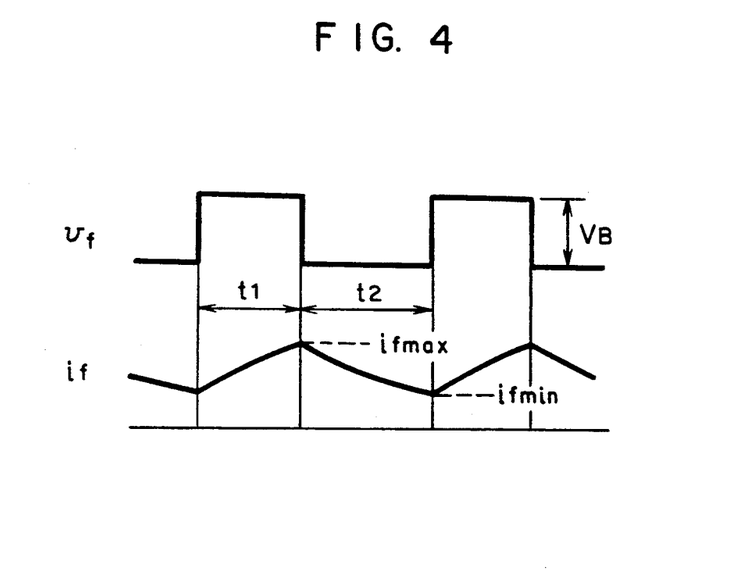
FIG. 4 shows waveforms for explaining the operation of the present invention.

In accordance with this difference voltage $E_1$, the PWM control unit 52 generates an on-off output $E_0$ of pulse width modulated (PWM) pulses, and thus applies an intermittent pulse voltage vf to the field winding 3 of the generator 1 through the chopper 53 as shown in FIG. 4.

FIG. 4 is a diagram for explaining relationship between the pulse voltage vf of the chopper 53 and the field current if. This diagram indicates that the pulse voltage vf of the same amplitude as the battery voltage $V_B$ causes a pulsation current represented by the field current if to flow in the field winding 3. The pulsation current takes a continuously-changing waveform as shown due to the function of the inductance of the field winding 3 and the flywheel diode $D_1$.

If a duty factor $\alpha(=t_1/(t_1+t_2))$ representing the relationship between the on duration $t_1$ and the off duration $t_2$ of the pulse voltage vf, that is, the relationship between the on duration and the period $t_1+t_2$ is changed, the field current if (average current If) is also changed.

Assume that if$_{max}$ designates a maximum value of the field pulsation current if, if$_{min}$ a minimum value thereof and If an average value (average current) thereof. The pulsation (ripple) $\Delta$if of the field current and the pulsation rate $\mu_1(=\Delta if/If)$ thereof is expressed as shown below.

$$\Delta if = if_{max} - if_{min} \quad (1)$$

$$\mu_1 = \Delta if/If = (if_{max} - if_{min})/If \quad (2)$$

Also, the pulsation (ripple) $\Delta if$ and the pulsation rate $\mu_1 = \Delta if/If$ of the field current if (average current If) in the circuit of FIG. 1 is generally expressed by equations below taking circuit constants into consideration.

$$\Delta if = V_B \cdot \alpha(1-\alpha)/L \cdot f \quad (3)$$

$$\mu_1 = V_B \cdot \alpha(1-\alpha)/L \cdot If \cdot f \quad (4)$$

where $V_B$ is the battery voltage, $\alpha$ the duty factor of the field pulse voltage, L the inductance of the field winding, f the field pulse frequency and If the average field current.

Figure 5:
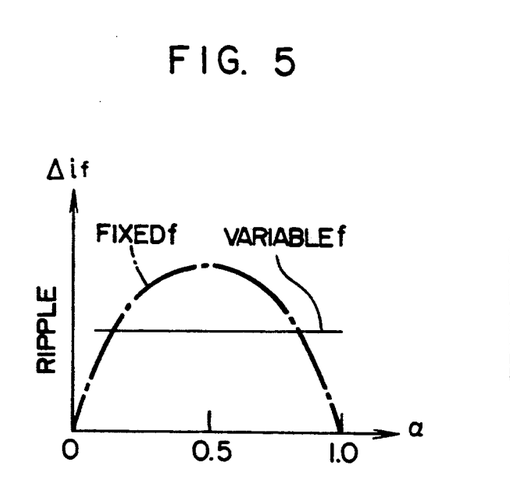
FIGS. 5 and 6 are characteristics diagrams for explaining the operation of the present invention.

Suppose the pulse frequency (chopping frequency) f is fixed. From equation (3), the pulsation (ripple) $\Delta if$ assumes a characteristic indicated by one-dot chain in the operation characteristic diagram of FIG. 5 showing the relationship between the duty factor $\alpha$ of the chopper 53 and the pulsation (ripple) $\Delta if$ of the field current if. This diagram indicates that if pulse frequency is fixed at f, a secondary function characteristic is exhibited in which the pulsation $\Delta if$ changes with the duty factor $\alpha$ in such a manner that $\Delta if$ is zero when $\alpha = 0$ or 1 and $\Delta if$ is maximum for $\alpha$ of 0.5.

The relationship between the variable pulse frequency (variable chopping frequency) f and the duty factor $\alpha$ is thus given by the secondary function equation below.

$$f = K_1 \cdot \alpha(1-\alpha) \quad (6)$$

where $K_1$ is a constant.

The equation (6) represents an inverse function of the equations (3) and (4).

Figure 6:
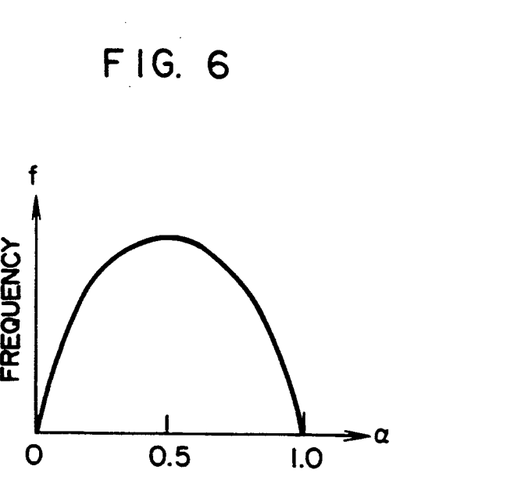

The equation (6) indicates that the variable frequency f assumes a characteristic designated by the solid line in the operation characteristics diagram of FIG. 6 showing the relationship between the duty factor $\alpha$ of the frequency variable chopper 53 and the frequency f in FIGS. 2 and 3.

The variable frequency in this case exhibits a secondary function characteristic with f assuming zero when $\alpha = 0$ or 1 and maximum for $\alpha$ of 0.5.

The pulsation $\Delta if$ in this case is thus given as shown below from equations (3) and (6).

$$\Delta if = V_B/L \cdot K_1 \quad (7)$$

As seen from equation (7), the pulsation (ripple) $\Delta if$ for the frequency f, as shown by solid line in FIG. 5, is constant regardless of the duty factor $\alpha$. Instead of the secondary function of the duty factor $\alpha$ due to equation (6), the variable frequency f may alternatively assume an approximate trapezoidal or trigonometric function of the duty factor $\alpha$. This approximate function method will be explained in detail later in this specification.

It is seen that if the chopper 53 is subjected to PWM control of frequency variable type according to the secondary function of equation (6) in this way, the pulsation (ripple) $\Delta if$ or the pulsation rate $\mu_1$ of the field current if of the field winding 3 can be fixed without regard to the duty factor $\alpha$.

Now, the operation of the frequency-variable PWM control unit 52 based on the equation (6) for controlling the frequency and the duty factor of the chopper 53 relatively to each other at the same time will be explained in detail with reference to FIGS. 7 and 8.

Figure 7:
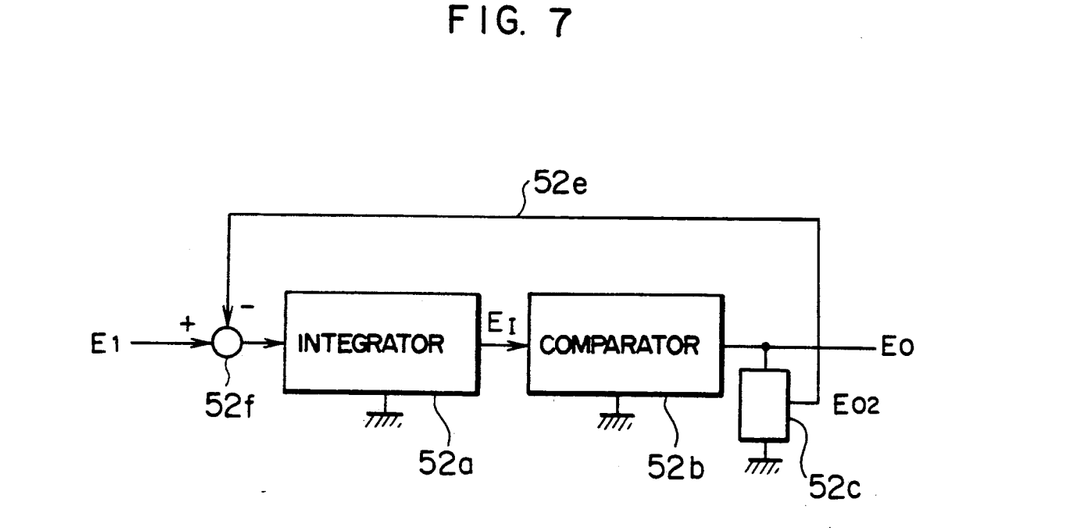
FIG. 7 is a schematic diagram of the embodiment in FIG. 2.
Figure 8:
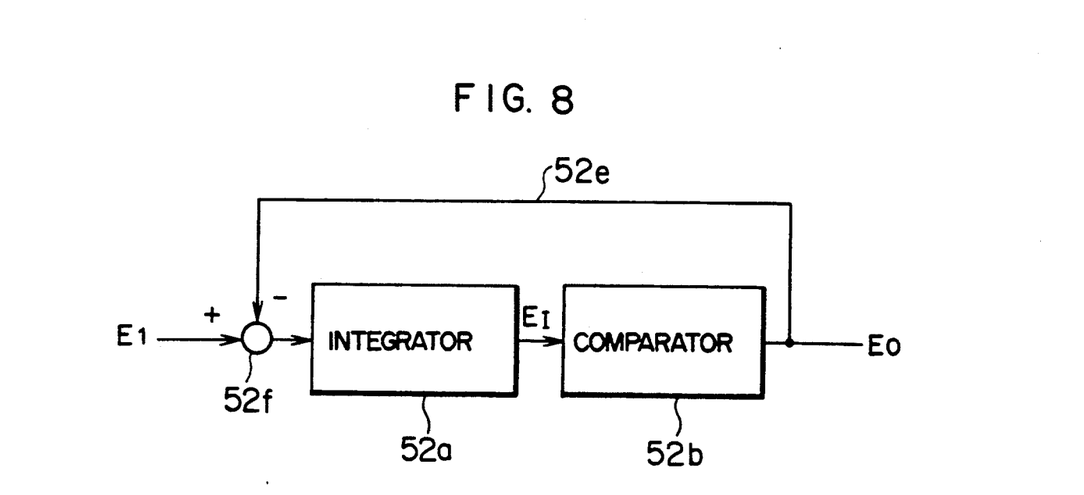
FIG. 8 is a schematic diagram of the embodiment in FIG. 3.

FIGS. 7 and 8 are diagrams showing basic circuits of the frequency-variable PWM control units 52 and 52' in FIGS. 2 and 3 respectively. Each circuit comprises an integrator and a comparator. The feature of the embodiment shown in FIG. 7 (FIG. 2) lies in that the resistance value and the capacity of the capacitor for determining the integration time constant of the integrator are reduced. Specifically the small values of resistance and capacitance permit a smaller chip area of the IC, thus making it advantageously possible to incorporate the capacitor and the like in an IC.

In FIG. 7, numeral 52a designates an integrator and numeral 52b a comparator with hysteresis. An output $E_1$ of the integrator 52a is applied to the comparator 52b. Numeral 52c designates a voltage dividing circuit for generating a voltage $E_{02}$ resulting from dividing the output $E_0$ of the comparator 52b into $1/n_0$. The difference between the voltage $E_{02}$ and the control input voltage (analog quantity) $E_1$ is applied to the integrator 52a for self-oscillation.

More specifically, the PWM output voltage $E_0$ reduced to $1/n_0$ ($E_{02} = E_0/n_0$), or more in particular reduced to $$\frac{R_{10}}{R_9 + R_{10}} = \frac{R_{17}}{R_{16} + R_{17}} = 1/n_0$$

in the PWM control unit 52 is applied through an input resistor $R_8$ to the integrator including the operational amplifier $A_2$. As a result, the charge current to the integration capacitor $C_2$ is reduced to $1/n_0$, thereby lengthening the charging time. For the same length of charging time, therefore, the capacity of the capacitor can be reduced to $1/n_0$ by reducing $E_0$ to $1/n_0$ as compared with the case where $E_0$ is fed back.

Figure 9:
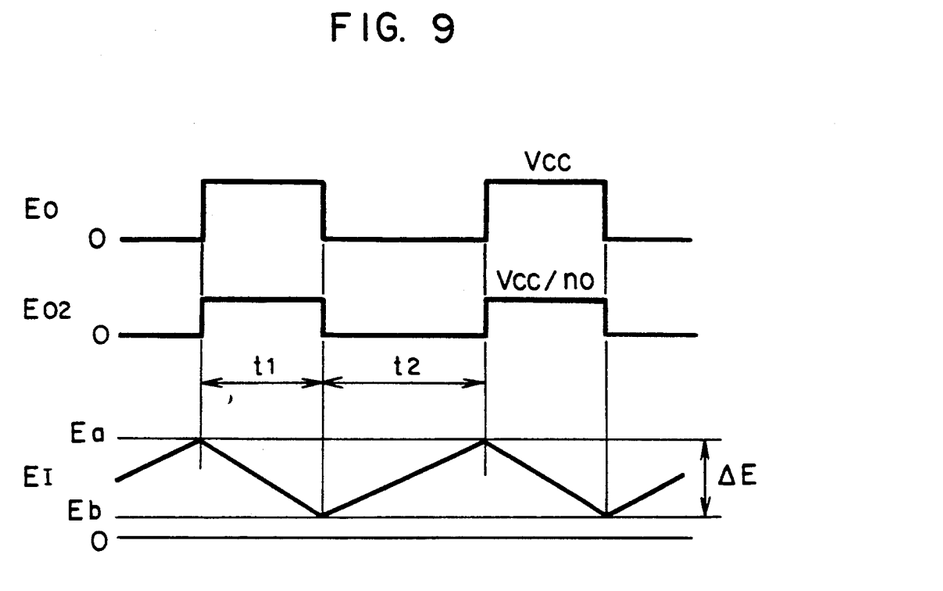
FIG. 9 shows waveforms for explaining the circuit configured as shown in FIG. 7.

In the operation waveform shown in FIG. 9, the output $E_I$ of the integrator is expressed by the relationship of equation (8) below.

$$E_I = \frac{E_1 - E_0}{n_0} \cdot t \quad (8)$$

From equation (8), assuming that it takes a time length of $t_1$ before the voltage $E_I$ shown in FIG. 9 decreases from a maximum $E_a$ to a minimum $E_b$, the time $t_1$ is given by an equation (9) below using equation (8).

$$t_1 = \frac{\Delta E}{\frac{V_{CC} - E_1}{n_0}} = \frac{\Delta E \cdot n_0}{V_{CC} - E_1} \quad (9)$$

Also, the time $t_2$ required for the voltage $E_I$ to reach a maximum $E_a$ from a minimum $E_b$ is expressed as $$t_2 = \frac{\Delta E}{\frac{E_1}{n_0}} = \frac{\Delta E \cdot n_0}{E_1} \quad (10)$$

From equation (9) and (10), the duty factor $\alpha$ and the frequency f of the PWM signal is given as $$a = \frac{t_1}{t_1 + t_2} = \frac{\frac{\Delta E \cdot n_0}{V_{CC} - E_1}}{\frac{\Delta E \cdot n_0}{V_{CC} - E_1} + \frac{\Delta E \cdot n_0}{E_1}} = \frac{E_1}{V_{CC}} \tag{11}$$

$$f = \frac{1}{t_1 + t_2} = \frac{1}{\frac{\Delta E \cdot n_0}{V_{CC} - E_1} + \frac{\Delta E \cdot n_0}{E_1}} = \frac{(V_{CC} - E_1) E_1}{\Delta E \cdot V_{CC} \cdot n_0} \tag{12}$$

By substituting the equation (11) into the equation (12) to eliminate $E_1$, the equation (13) below is obtained.

$$f = \frac{V_{CC}}{\Delta E \cdot n_0} \cdot a(1 - a) \tag{13}$$

Equations (11) and (13) show that the duty factor $a$ is proportional to the input voltage $E_1$ in the relationship of a secondary function with the frequency f assuming a maximum value against the duty factor $a$ of 0.5. The frequency f in this case is determined by the ratio between the PWM output voltage $E_0$ and the input voltage $E_{02}$ of the integrator, that is, $n_0 = E_0/E_{02}$. This indicates that the frequency f is reduced by increasing the value $n_0$ without resorting to the capacitor $C_2$ of the integrator.

Figure 10:
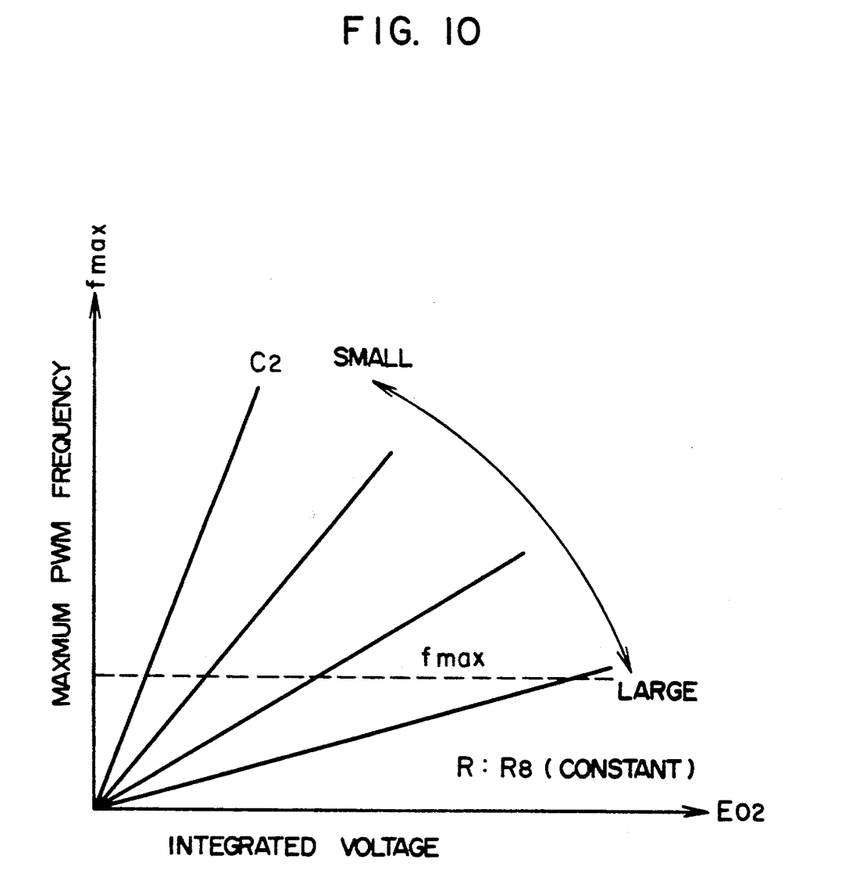
FIG. 10 is a characteristics diagram for explaining the operation of the circuit configured as shown in FIG. 7.

An example of the above-mentioned PWM control characteristics of small capacity type is shown in FIG. 10. This diagram with the abscissa thereof representing the PWM output voltage $E_{02}$ reduced to $1/n_0$ and the ordinate thereof representing the maximum value (frequency for the duty factor $a$ of 0.5) $f_{max}$ of the PWM frequency f shown in equation (13), indicates a characteristic where the resistance $R_8$ is kept constant with the capacitance of the integration capacitor $C_2$ as a parameter.

As will be understood from FIG. 10, if the maximum PWM frequency is set to $f_{max}$, the capacitance of the integration capacitor $C_2$ is reduced by reducing the integration voltage $E_{02}$ for the same frequency.

Figure 11:
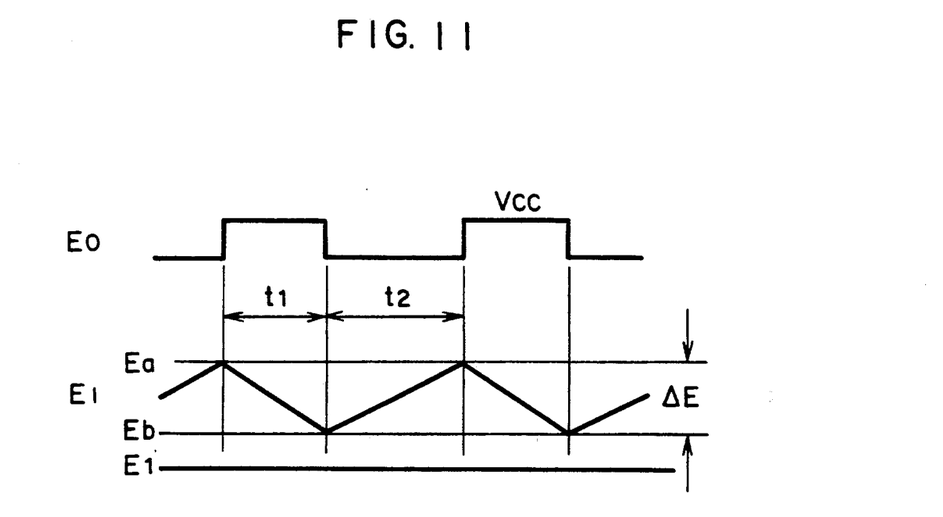
FIG. 11 shows waveforms for explaining the operation of the circuit configured as shown in FIG. 8.

Explanation will be made about the embodiment shown in FIG. 8. In FIG. 8, numeral 52a designates an integrator, and numeral 52b a comparator with hysteresis. An output $E_I$ of the integrator 52a is applied to the comparator 52b, and the difference between the output $E_0$ of the comparator 52b and a control input voltage (analog quantity) $E_1$ is applied to the integrator 52a for the purpose of self-oscillation. FIG. 11 shows waveforms of the comparator output $E_0$ and the integrator output $E_I$. In this configuration, the integrator output $E_I$ against the comparator output $E_0$ is given by the equation (14) below with the related waveform shown in FIG. 11.

$$E_I = (E_1 - E_0) \cdot t \tag{14}$$

where t is the time. Assuming that the integrator output $E_I$ is increased by the control input $E_1$ and reaches $E_a$ while the comparator output $E_0$ remains zero, the comparator characteristics are such that the comparator output $E_0$ becomes $V_{cc}$, thus reducing the integrator output $E_I$. In the process, assuming that it takes time $t_1$ for the voltage $E_I$ to decrease from $E_a$ to $E_b$, the time $t_1$ is given as shown below from the equation (14).

$$t_1 = \Delta E/(V_{cc} - E_1) \tag{15}$$

where $\Delta E = E_a - E_b$, and when the integrator output $E_I$ reaches $E_b$, the comparator characteristics with hysteresis causes the comparator output $E_0$ to decrease to zero. As a result, the integrator output $E_I$ is increased by the control input $E_1$. Assume again that it takes time $t_2$ for the voltage $E_I$ to rise from $E_b$ to $E_a$. The time $t_2$ is given as $$t_2 = \Delta E/E_1 \tag{16}$$

The output $E_0$ of the comparator 52b takes the form of rectangular wave pulses assuming the potential of $V_{cc}$ during time $t_1$ and zero during $t_2$. If the duty factor of this rectangular pulse voltage $E_0$ is $a$ and the frequency thereof f, $a$ and f are given by the equations (15) and (16) below.

$$\begin{aligned} a &= t_1/(t_1 + t_2) \\ &= \{\Delta E/(V_{CC} - E_1)\}/\{\Delta E/(V_{CC} - E_1) + \Delta E/E_1\} \\ &= E_1/V_{CC} \end{aligned} \tag{17}$$

$$\begin{aligned} f &= 1/(t_1 + t_2) \\ &= 1/\{\Delta E/(V_{CC} - E_1) + \Delta E/E_1\} \\ &= (V_{CC} - E_1) \cdot E_1/\Delta E \cdot V_{CC} \end{aligned} \tag{18}$$

Substituting the equation (17) into equation (18) to erase $E_1$, $$f = (V_{cc}/\Delta E) \cdot a(1 - a) \tag{19}$$

From equation (17), it is seen that if the source voltage $V_{cc}$ is constant, the duty factor $a$ is proportional to the control input voltage $E_1$. Also, from equation (19), it is known that the voltage difference $\Delta E$ due to the characteristics of the comparator 52b being constant, the frequency f is expressed as the secondary function of the duty factor $a$ equivalent to equation (6), and thus assumes a characteristic equivalent to the one shown in FIG. 6. Specifically, the frequency-variable PWM control unit 52 including the integer 52a and the comparator 52b with hysteresis making up a self-oscillator makes possible a frequency variable PWM control process in which the duty factor $a$ is proportional to the control input voltage $E_1$ and the frequency f changes as the secondary function of the duty factor $a$ due to the equations (6) and (19), thus permitting the pulsation (ripple) $\Delta if$ of the field current if of the generator 1 to be dampened to a constant value without regard to the duty factor $a$.

Figure 12:
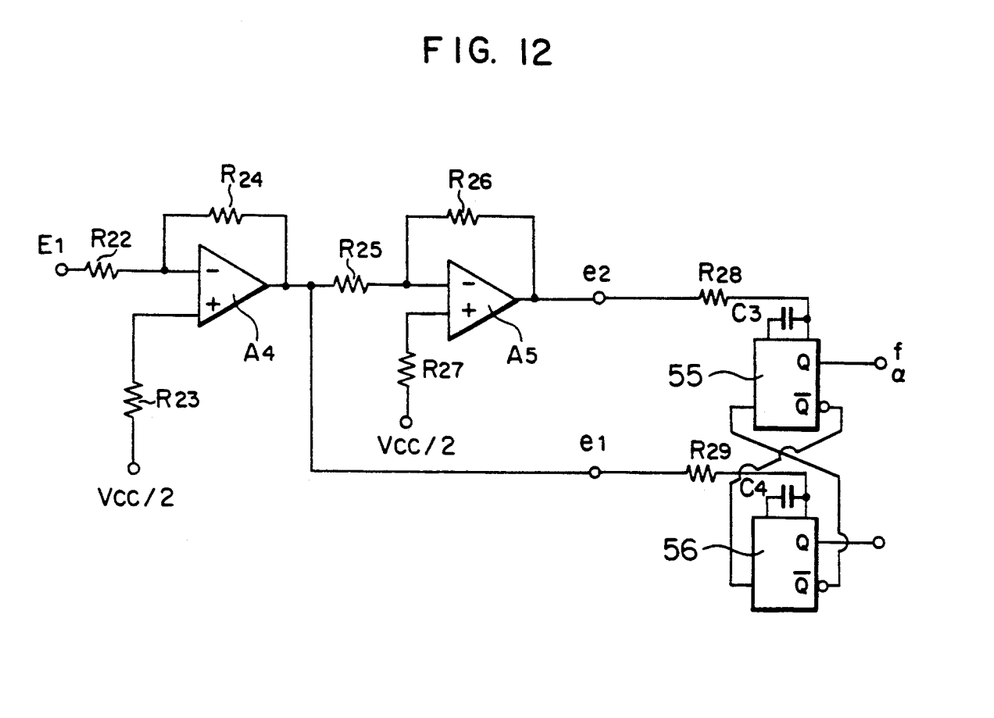
FIG. 12 is a circuit diagram of another embodiment of a frequency variable PWM control system shown in FIG. 3.
Figure 13:
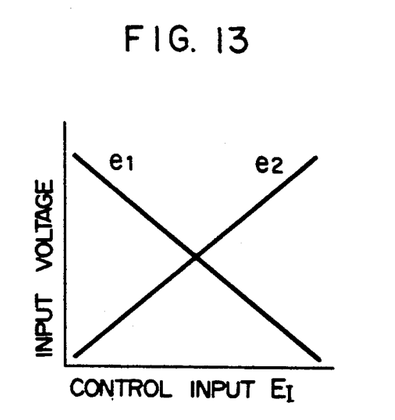
FIGS. 13 and 14 are characteristics diagrams for explaining the operation of the circuit as configured in FIG. 12.
Figure 14:
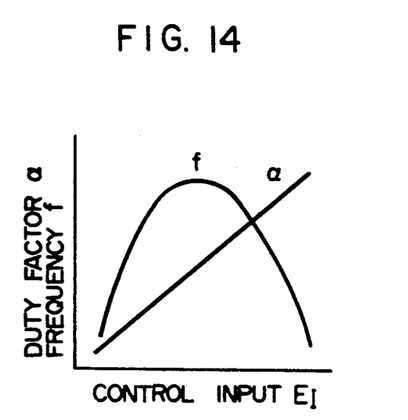

FIG. 12 is a circuit diagram showing another embodiment of the frequency-variable PWM control unit 52' of FIG. 3. In FIG. 12, characters $A_4$ and $A_5$ designate amplifiers with gain 1, numerals 55, 56 a monostable multivibrator, $R_{22}$ to $R_{29}$ resistors, $C_3$, $C_4$ capacitors, $e_1$, $e_2$ input signals, and f and an a output frequency and a duty factor representing the input to the chopper 53. The capacitors $C_3$ and $C_4$ combined with external resistors $R_{15}$ and $R_{16}$ determine the operating time of the monostable multivibrators 55 and 56, and by connecting the inputs and outputs of the monostable multivibrators 55 and 56 crosswise to each other, they operate as an astable multivibrator (oscillator). FIG. 13 shows a characteristic diagram showing an input voltage of an input signal $e_1$, $e_2$ against the control input $E_1$ of FIG. 12. FIG. 14 is an output characteristic diagram of the duty factor $a$ and the frequency f against the control input $E_1$ of FIG. 12. If the input voltages of the signals $e_1$ and $e_2$ corresponding to the control input $E_1$ in FIG. 12 are differential, it is possible to control the duty factor $\alpha$ and the frequency f of the output against the control input $E_1$ of the control system as shown in FIG. 14. The duty factor $\alpha$ and the frequency f of the output against the control input $E_1$ are controllable to constant level without regard to the frequency-variable PWM control unit of FIG. 8.

Figure 15:
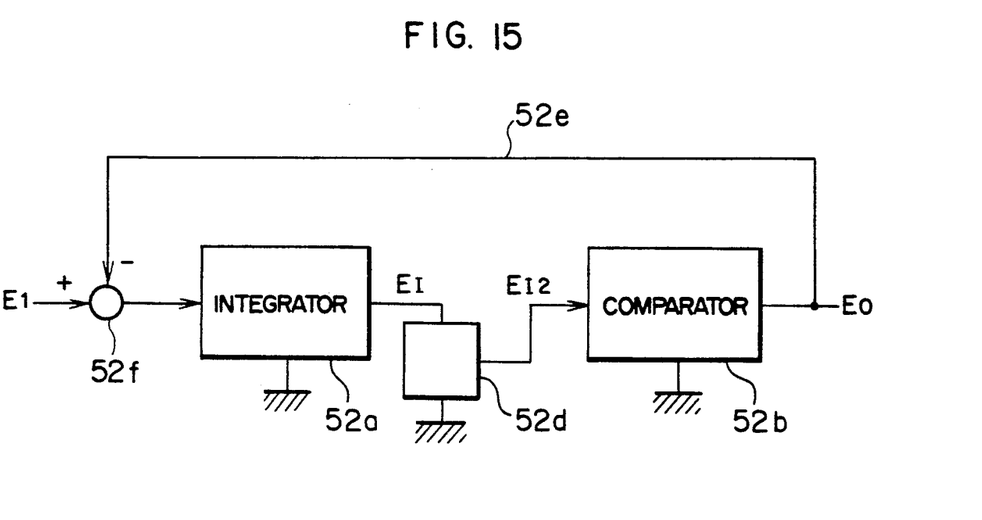
FIG. 15 is a schematic diagram showing a still further embodiment of the circuit shown in FIG. 2.

FIG. 15 shows a circuit according to another embodiment of the frequency-variable PWM control unit 52 shown in FIG. 2. The embodiment of FIG. 15 is also made up of the essential parts including an integrator and a comparator basically similar to the embodiment of FIG. 7, but different from the embodiment of FIG. 7 in that the voltage-dividing circuit of the comparator 52d is inserted on the output side of the integrator 52a to reduce the integrator output $E_I$ to $1/n_0$.

The input $E_{I2}$ of the comparator 52b is given as $E_I/n_0$ and the output $E_0$ is fed back to the integrator 52a directly without being divided.

Figure 16:
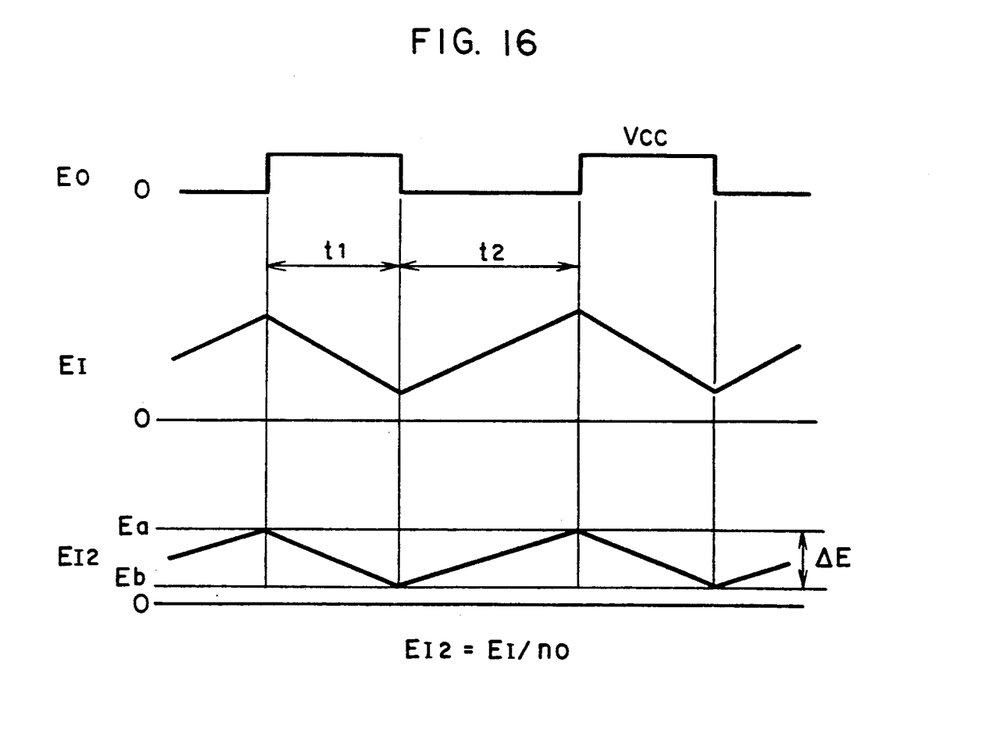
FIG. 16 is a diagram showing waveforms for explaining the operation of the circuit as configured in FIG. 15.

Waveforms representing the circuit operation of the embodiment shown in FIG. 15 are illustrated in FIG. 16.

As seen from the waveforms of FIG. 16, the integration time is lengthened if energization the signal of the integrator output $E_I$ at the operation levels $E_a$ and $E_b$ of the comparator 52b, thereby realizing a PWM control unit of small capacitance type as in the embodiment of FIG. 7.

Figure 17:
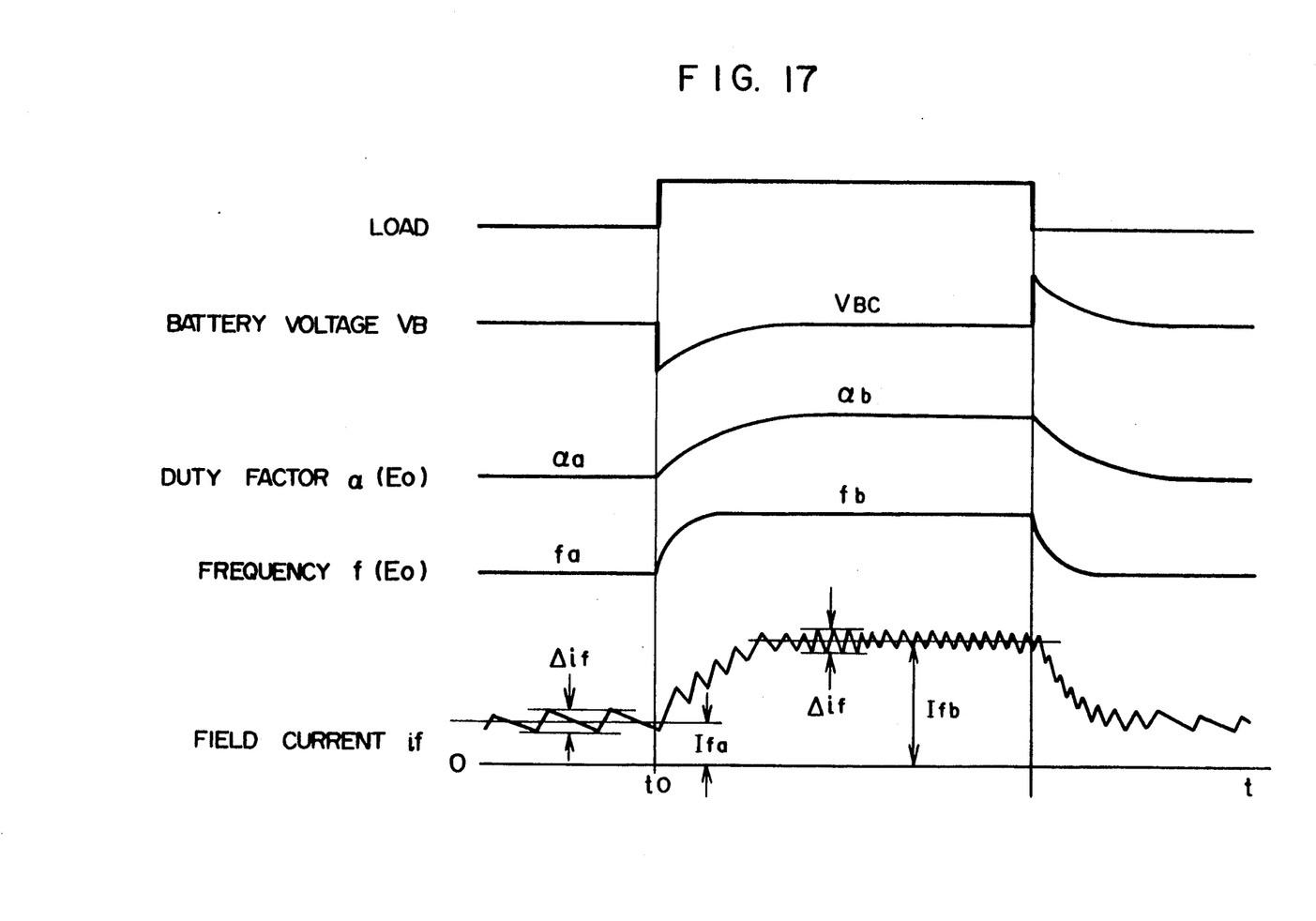
FIG. 17 is a diagram showing waveforms for explaining the operation of a control system according to the present invention.

FIG. 17 is a diagram for explaining the transient operation under changing loads in the embodiments of FIGS. 2 and 3. In FIG. 17, the waveform representing the operation of the various parts under variations of the load 8 is plotted with the operation time t enlarged. With a sharp increase in the load 8 at time point $t_0$, the battery voltage $V_B$ decreases sharply, and therefore the voltage control unit 51 is energized and a difference voltage $E_1$ is produced, which is used as a control input voltage $E_1$ to generate a frequency-variable PWM control pulse $E_0$ from the frequency-variable PWM control unit 52 (52'). The chopper 53 operated in accordance with the duty factor $\alpha$ ($E_0$) and the frequency f ($E_0$) is thus controlled to increase the field current if of the generator 1, thus controlling the battery voltage $V_B$ to a set value $V_{BC}$. Simultaneously with the increase in the chopper duty factor $\alpha$ ($E_0$) from $\alpha_a$ to $\alpha_b$, the frequency f ($E_0$) also changes from $f_a$ to $f_b$, with the result that the average value If of the field current if increases from level $I_{fa}$ to $I_{fb}$. Since the frequency f ($E_0$) is variable according to the equations (6) and (13) or (19), however, the pulsation (ripple) $\Delta$if is kept constant and remains unchanged. Consequently, though not shown, any variations of the battery voltage $V_B$ are not exhibited under the effect of the pulsation $\Delta$if of the field current if.

In the aforementioned embodiments, the variable frequency f of the frequency-variable PWM control unit 52 may be approximately a trapezoidal or trigonometric function of the duty factor $\alpha$ instead of the secondary function based on the equations (6), (13) and (19) of the duty factor $\alpha$. Further, the variable frequency f of the frequency-variable PWM control unit 52 according to the present invention, which corresponds to the duty factor $\alpha$, is not limited to such a correspondence as mentioned above.

Now, another embodiment of the invention using an approximate function of equation (13) or (19) will be explained.

Figure 18:
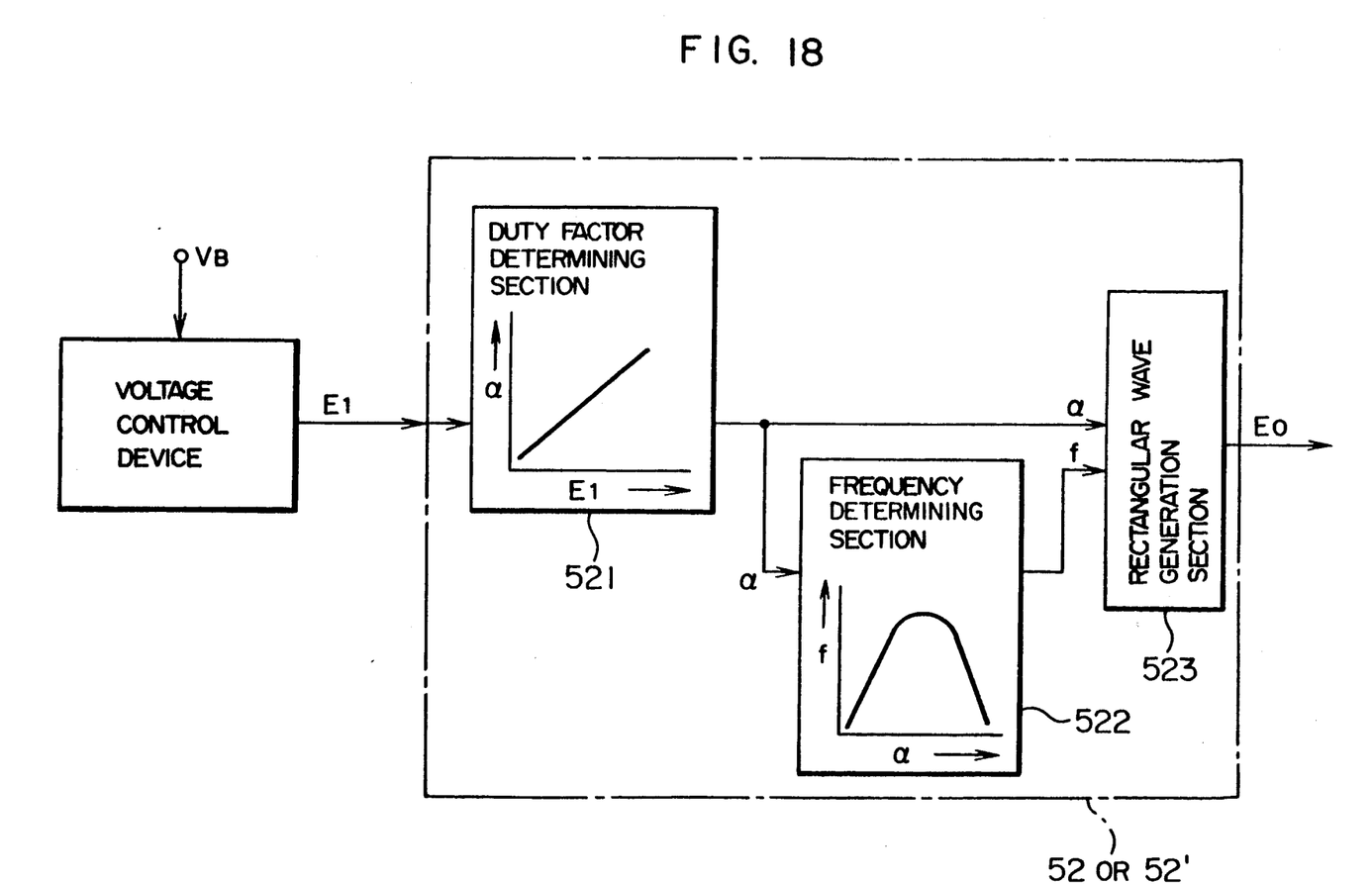
FIGS. 18, 19A and 19B are block diagrams showing other embodiments of a variable frequency PWM control system according to the present invention.

The frequency-variable PWM control unit 52, 52' according to the above-mentioned embodiments may alternatively configured as shown in FIG. 18. In FIG. 18, numeral 521 designates means for determining the duty factor $\alpha$, numeral 522 means for determining a frequency, and numeral 523 means for generating a rectangular wave. The duty factor-determining means 521 determines a duty factor $\alpha$ in accordance with the difference voltage signal $E_1$ applied thereto from the voltage control unit 51. The frequency-determining means 522 determines a frequency f associated with the duty factor in accordance with the function of equation (13) or (19). The rectangular wave generation means 523 generates a rectangular wave $E_0$ of the duty factor $\alpha$ and frequency f thus determined and applies it to the chopper 53.

Figure 19A:
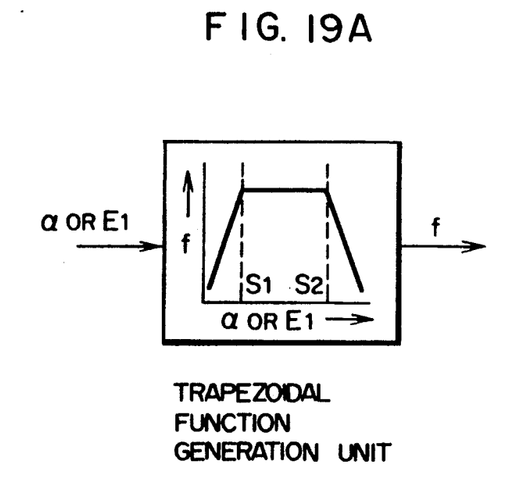
Figure 19B:
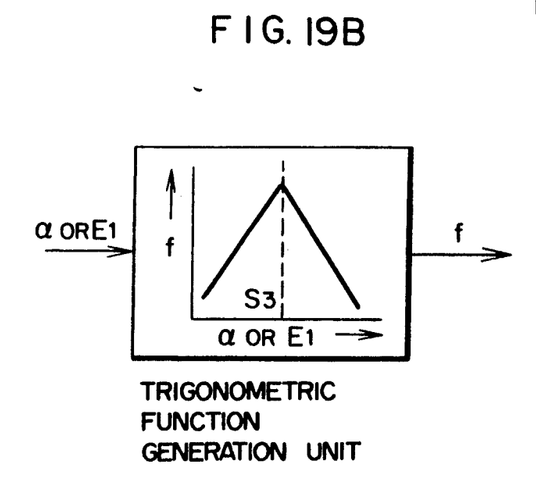

In an embodiment using an approximate function, the frequency-determining means 522 is replaced by a function generation means shown in FIG. 19A or 19B. In the case of FIG. 19A, for example, the frequency f assumes a trapezoidal function of the duty factor $\alpha$. In any case, the frequency f is a secondary function of the quadratic curve in FIG. 6 or 14.

In the case where the frequency f corresponding to $E_1$ or $\alpha$ is determined by use of microcomputer, the time required for determining the frequency f is shortened if a trapezoidal or trigonometric characteristic is used as an approximate value of the quadratic curve.

Specifically, if a trapezoidal function generation unit is used, for example, the microcomputer increases the frequency f at a predetermined rate in accordance with the increase in $\alpha$ ($E_1$) for the value of $\alpha$ (or $E_1$) from O to $S_1$, keeps the frequency f at a fixed value $f_{max}$ for the range from $S_1$ to $S_2$, and reduces the value f at a predetermined change rate for the range from $S_2$ to $\alpha_{max}(E_{1max})$.

If the trigonometric function generation unit is used, on the other hand, the microcomputer increases the frequency f at a predetermined rate for the value of $\alpha$ (or $E_1$) from O to $S_3$ in accordance with the increase in $\alpha$ ($E_1$), and reduces the value f at a predetermined change rate in accordance with the increase in $\alpha$ ($E_1$) for the range from $S_3$ to $\alpha_{max}(E_{1max})$.

We claim:

1. A charging generator control system for automobiles, comprising:
   chopper means for controlling a field current of a generator; and
   output control means for comparing an output voltage of said generator with a predetermined voltage target value, detecting a difference therebetween, controlling a duty factor of an output signal of said chopper means in accordance with said difference, and reducing said difference substantially to zero, including controlling a frequency of said output signal of said chopper means in accordance with the duty factor.

2. A system according to claim 1, wherein said output control means includes a voltage control circuit for detecting said output voltage of said generator, comparing said output voltage of said generator with said predetermined voltage target value thereby to detect the difference therebetween, and generating an output signal for reducing said differences to zero in accordance with said difference, and a chopper control circuit supplied with said output signal of said voltage control circuit for controlling the duty factor and the frequency of said output signal of said chopper means at the same time in accordance with said output signal of said voltage control circuit.

3. A system according to claim 2, wherein said chopper control circuit controls said chopper means so as to maintain a predetermined relationship between the output frequency f and the duty factor $\alpha$ of said output signal of the chopper means, the predetermined relationship being substantially represented by $f \propto \alpha(1-\alpha)$.

4. A system according to claim 2, wherein the chopper control circuit controls the chopper means in accordance with a function approximating $f \propto \alpha(1-\alpha)$ so as to maintain a predetermined relationship between the output frequency f and the duty factor $\alpha$ of said output signal of the chopper means.

5. A system according to claim 4, wherein said function is a trapezoidal function.

6. A system according to claim 4, wherein said function is a trigonometric function.

7. A system according to claim 2, wherein said chopper control circuit includes an integration circuit for integrating an input signal thereto, a comparator for comparing an output of said integration circuit with a predetermined reference value and applying an output signal representing a difference therebetween to said chopper means, and a feedback circuit for applying a difference between the output signal of said comparator and said output signal of said voltage control circuit as said input signal to said integration circuit.

8. A system according to claim 7, wherein said feedback circuit includes a dividing circuit for dividing the output signal of said comparator by a predetermined dividing ratio, and a subtracter for producing a difference between an output signal of said dividing circuit and said output signal of said voltage control circuit.

9. A system according to claim 7, wherein said chopper control circuit further includes a dividing circuit for dividing the output of said integration circuit by a predetermined dividing ratio, and wherein said comparator compares an output of said dividing circuit with said predetermined reference value and applies an output signal representing a difference therebetween to said chopper means.

10. A charging generator control system for automobiles, comprising:
  chopper means for controlling a field current of a generator;
  a voltage feedback circuit for comparing an output voltage of said generator with a predetermined voltage target value, detecting a difference therebetween, and producing an output for reducing the difference to zero;
  an oscillation circuit for generating a rectangular wave signal having a duty factor $\alpha$ in accordance with the output of said voltage feedback circuit, and applying said rectangular wave signal to said chopper means; and
  a frequency control circuit in accordance with the frequency f of said oscillation circuit in accordance with the duty factor $\alpha$ so as to maintain a predetermined relationship between the frequency f and the duty factor $\alpha$, the predetermined relationship being substantially represented by $f \propto \alpha(1-\alpha)$.

11. A charging generator control system for automobiles, comprising:
  chopper means for controlling a field current of a generator;
  a voltage feedback circuit for comparing an output voltage of said generator with a predetermined voltage target value, detecting a difference therebetween, sand producing an output for reducing the difference to zero;
  means for generating a duty factor command signal representing a duty factor $\alpha$ in accordance with the output of said voltage feedback circuit;
  means for generating a frequency command signal representing a frequency f in accordance with the duty factor $\alpha$ so as to maintain a predetermined relationship between the frequency f and the duty factor $\alpha$, the predetermined relationship being substantially represented by $f \propto \alpha(1-\alpha)$; and
  rectangular wave signal generation means for generating a rectangular wave signal having said duty factor $\alpha$ and said frequency f in response to said duty factor command signal and said frequency command signal, and applying said rectangular wave signal to said chopper means.

12. A system according to claim 11, wherein said rectangular wave signal generation means includes an astable multivibrator having two flip-flop circuits with inputs and outputs thereof connected crosswise to each other.

13. A system according to claim 11, wherein said frequency command signal generating means generates a trapezoidal function approximating $f \propto \alpha(1-\alpha)$.

14. A system according to claim 11, wherein said frequency command signal generating means generates a trigonometric function approximating $f \propto \alpha(1-\alpha)$.

15. A charging generator control system for automobiles, comprising:
  chopper means for controlling a field current of a generator; and
  output control means for comparing an output voltage of said generator with a predetermined voltage target value, detecting a difference therebetween, controlling a duty factor of an output signal of said chopper means in accordance with said difference, and reducing said difference substantially to zero, including controlling a frequency of said output signal of said chopper means in accordance with the duty factor;
  wherein the output control means includes an integration circuit for integrating an output signal thereto, a comparator for comparing an output of said integration circuit with a predetermined reference value and applying an output signal representing a difference therebetween to said chopper means, and a feedback circuit for applying a difference between the output signal of said comparator and a signal representing said difference between said output voltage of said generator and said predetermined voltage target value as said input signal to said integration circuit.

16. A charging generator control system for automobiles, comprising:
  chopper means for controlling a field current of a generator;
  means for comparing an output voltage of said generator with a predetermined voltage target value and detecting a difference therebetween;
  means for determining a duty factor of said chopper means for reducing said difference substantially to zero in accordance with said difference;
  means for determining a frequency of said chopper means for maintaining a ripple of said field current substantially constant in accordance with said duty factor; and
  means for driving said chopper means with said duty factor and said frequency.

* * * * *